United States Patent
Takami et al.

(10) Patent No.: US 12,110,828 B2
(45) Date of Patent: Oct. 8, 2024

(54) GAS TURBINE ENGINE FOR USE IN AIRCRAFT

(71) Applicant: KAWASAKI JUKOGYO KABUSHIKI KAISHA, Kobe (JP)

(72) Inventors: Hiroaki Takami, Kobe (JP); Naoya Sekoguchi, Kobe (JP); Katsuhiko Ishida, Kobe (JP); Kenta Umezaki, Kobe (JP); Hiroshi Sakamoto, Kobe (JP); Tatsuhiko Goi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/250,938

(22) PCT Filed: Oct. 28, 2020

(86) PCT No.: PCT/JP2020/040542
§ 371 (c)(1),
(2) Date: Apr. 27, 2023

(87) PCT Pub. No.: WO2022/091275
PCT Pub. Date: May 5, 2022

(65) Prior Publication Data
US 2023/0407794 A1    Dec. 21, 2023

(51) Int. Cl.
*F02C 7/275* (2006.01)
*B64D 41/00* (2006.01)
*F02C 7/32* (2006.01)

(52) U.S. Cl.
CPC ............... *F02C 7/32* (2013.01); *B64D 41/00* (2013.01)

(58) Field of Classification Search
CPC ..... F02C 7/275; F02C 7/32; F02C 9/18; B64D 41/00
See application file for complete search history.

(56) References Cited

U.S. PATENT DOCUMENTS 3,779,006 A * 12/1973 Lewis ..................... E04B 1/941
244/54
2010/0242496 A1    9/2010 Cass et al.
(Continued)

FOREIGN PATENT DOCUMENTS

| EP | 2829706 A1 | 1/2015 |
| EP | 3 722 559 A1 | 10/2020 |
| WO | 2012/137843 A1 | 10/2012 |

*Primary Examiner* — Steven M Sutherland
(74) *Attorney, Agent, or Firm* — Studebaker & Brackett PC

(57) ABSTRACT

A core engine including a core casing covering a low-pressure rotary structure and a high-pressure rotary structure and includes a passage of air flowing through the low-pressure and the high-pressure rotary structures; a fan located in front of the core engine; an inner cowl serving as an inner peripheral surface of a bypass passage that extends through the fan and bypasses the core engine; an accessory gear box that extracts power from the low-pressure or the high-pressure rotary structure and supplies the power to accessories; an auxiliary compressor attached to the accessory gear box, is driven by power of the accessory gear box, and increases pressure of compressed air extracted from the core engine; and a compressed air pipe that extends through an inside of a strut connecting the core engine and an airframe and supplies the compressed air having an increased pressure by the auxiliary compressor to the airframe.

5 Claims, 2 Drawing Sheets

(56) References Cited

U.S. PATENT DOCUMENTS

| | | |
|---|---|---|
| 2011/0203293 A1 | 8/2011 | Glahn |
| 2014/0038770 A1 | 2/2014 | Goi et al. |
| 2014/0165589 A1 | 6/2014 | Cloft et al. |
| 2016/0010561 A1 | 1/2016 | Cloft et al. |
| 2017/0268423 A1 | 9/2017 | Schwarz |
| 2018/0162537 A1* | 6/2018 | Schwarz ............... B64D 27/10 |
| 2019/0112060 A1 | 4/2019 | Venter et al. |
| 2019/0233123 A1* | 8/2019 | Sharpe .................... F02C 6/08 |
| 2020/0325828 A1 | 10/2020 | De Carné-Carnavalet et al. |

\* cited by examiner

GAS TURBINE ENGINE FOR USE IN AIRCRAFT

CROSS-REFERENCE TO RELATED APPLICATIONS

This application is the U.S. National Stage of International Application No. PCT/JP2020/040542 filed Oct. 28, 2020, the entire content of which is incorporated herein by reference.

TECHNICAL FIELD

The present disclosure relates to a gas turbine engine for use in an aircraft.

BACKGROUND ART

A gas turbine engine for use in an aircraft includes an accessory gear box that drives various accessories. The accessory gear box extracts power from a rotary structure in the gas turbine engine and supplies the extracted power to various accessories. When the gas turbine engine includes a fan, the accessory gear box is located outside a fan case that covers the fan (see PTL 1, for example).

CITATION LIST

Patent Literature

PTL 1: International Publication No. 2012/137843

SUMMARY OF INVENTION

Technical Problem

An airframe of an aircraft includes an air conditioner that adjusts the temperature and pressure of compressed air, extracted from a compressor of the gas turbine engine, to appropriate temperature and appropriate pressure and supplies the compressed air to a passenger room. The inventors of the present disclosure have been developing a system that increases the pressure of the compressed air, extracted from the compressor of the gas turbine engine, by an auxiliary compressor and supplies the compressed air to the airframe (air conditioner) instead of directly supplying the extracted compressed air to the airframe.

In recent years, from the viewpoint of improvement of fuel efficiency, a bypass ratio of the turbo fan engine is getting higher, i.e., the size of the fan is getting bigger, and the outer diameter of the fan case tends to increase. Therefore, when the accessory gear box and the auxiliary compressor are located outside the fan case, the outer diameter of the entire gas turbine engine increases, and a frontal projected area of the entire gas turbine engine increases.

The present disclosure was made under these circumstances, and an object of the present disclosure is to provide a gas turbine engine for use in an aircraft, the gas turbine engine including an auxiliary compressor that is driven by power acquired from an accessory gear box and increases pressure of compressed air to be supplied to an airframe, an outer diameter of the entire gas turbine engine being able to be suppressed.

Solution to Problem

A gas turbine engine for use in an aircraft according to one aspect of the present disclosure includes: a core engine including a low-pressure rotary structure including a low-pressure compressor and a low-pressure turbine which are coupled to each other, a high-pressure rotary structure including a high-pressure compressor and a high-pressure turbine which are coupled to each other, and a core casing that covers the low-pressure rotary structure and the high-pressure rotary structure and includes a passage of air flowing through the low-pressure rotary structure and the high-pressure rotary structure; a fan located in front of the core engine; an inner cowl that serves as an inner peripheral surface of a bypass passage that extends through the fan and bypasses the core engine; an outer cowl that serves as an outer peripheral surface of the bypass passage; an accessory gear box that extracts power from the low-pressure rotary structure or the high-pressure rotary structure and supplies the extracted power to various accessories; an auxiliary compressor that is attached to the accessory gear box, is driven by power acquired from the accessory gear box, and increases pressure of compressed air extracted from the core engine; and a compressed air pipe that extends through an inside of a strut connecting the core engine and an airframe and supplies to the airframe the compressed air that has been increased in pressure by the auxiliary compressor. The accessory gear box and the auxiliary compressor are located in an inner space between the core casing and the inner cowl.

According to this configuration, since the accessory gear box and the auxiliary compressor are located inside the inner cowl, the outer diameter of the entire gas turbine engine can be made smaller than that when the accessory gear box and the auxiliary compressor are located outside the fan case.

Advantageous Effects of Invention

The above configuration can provide the gas turbine engine for use in the aircraft, the gas turbine engine including the auxiliary compressor that is driven by the power acquired from the accessory gear box and increases the pressure of the compressed air to be supplied to the airframe, the outer diameter of the entire gas turbine engine being able to be suppressed.

DESCRIPTION OF EMBODIMENTS

Figure 1:
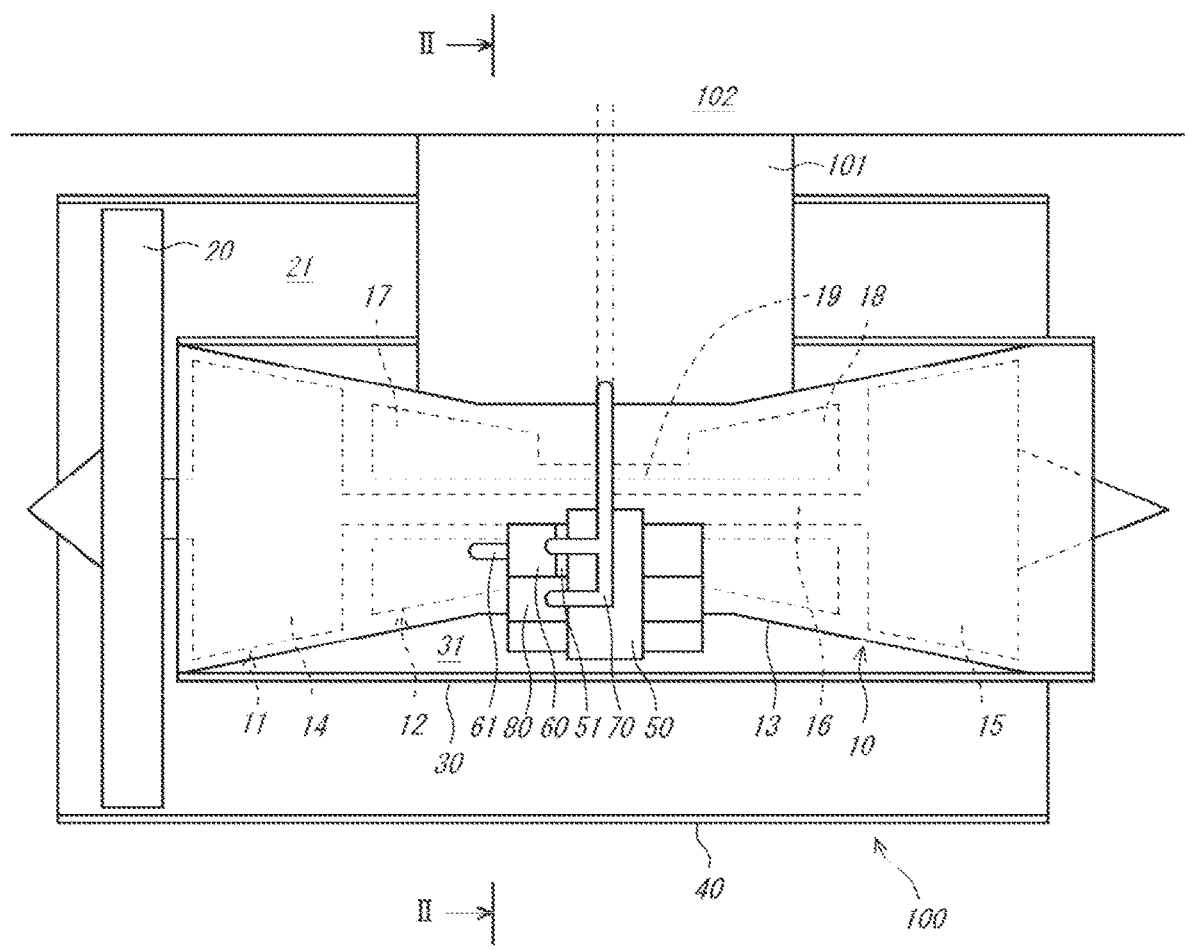
FIG. 1 is a schematic side view of a gas turbine engine according to an embodiment.
Figure 2:
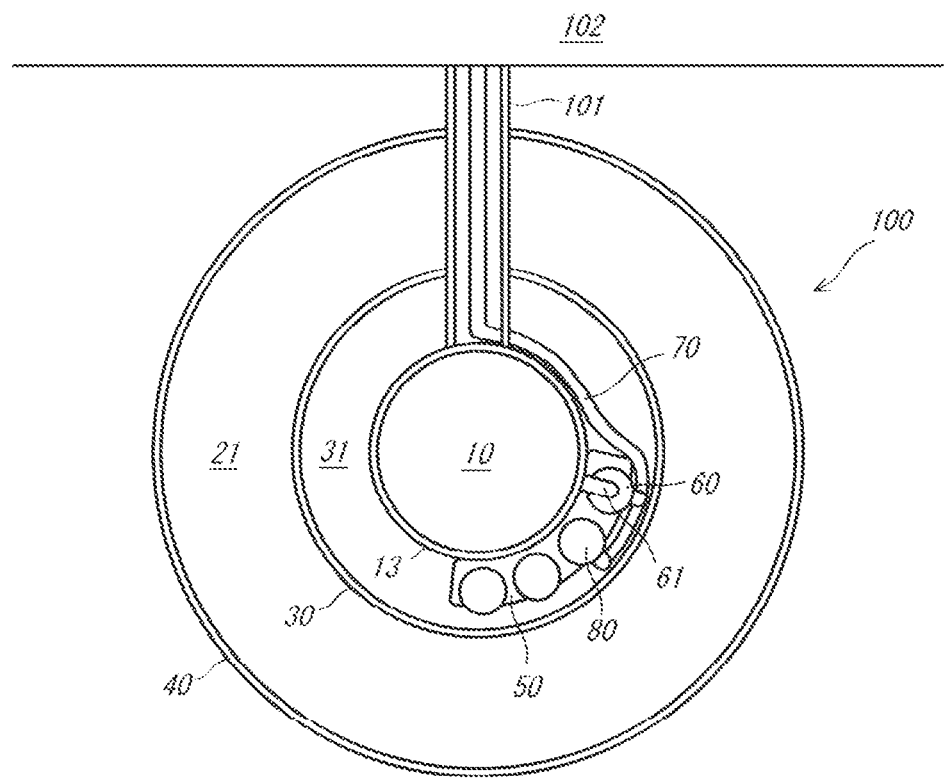
FIG. 2 is a sectional view taken along line II-II of FIG. 1.

Hereinafter, a gas turbine engine 100 according to the present embodiment will be described. FIG. 1 is a schematic side view of the gas turbine engine. In FIG. 1, a below-described inner cowl 30 and a below-described outer cowl 40 are shown as sections. FIG. 2 is a sectional view taken along line II-II of FIG. 1.

In the following description, "front" denotes an upstream side in a direction in which air flows in the gas turbine engine 100, and "rear" denotes a downstream side in the direction in which the air flows in the gas turbine engine 100. To be specific, "front" denotes a side where a fan 20 is located in an axial direction of a rotating shaft of the gas turbine engine 100, and "rear" denotes a side opposite to the side where the fan 20 is located in the axial direction of the rotating shaft of the gas turbine engine 100. A "radial direction" denotes a direction orthogonal to a rotation axis of the rotating shaft of the gas turbine engine 100. A "circumferential direction" denotes a direction around the rotation axis of the rotating shaft of the gas turbine engine 100.

The gas turbine engine 100 according to the present embodiment is supported by an airframe 102 through a strut 101. As shown in FIG. 1, the gas turbine engine 100 according to the present embodiment includes a core engine 10, the fan 20, the inner cowl 30, the outer cowl 40, an accessory gear box 50, an auxiliary compressor 60, a compressed air pipe 70, and an air starter 80. Hereinafter, these components will be described in order.

The core engine 10 includes a low-pressure rotary structure 11, a high-pressure rotary structure 12, and a core casing 13. The low-pressure rotary structure 11 includes a low-pressure compressor 14, a low-pressure turbine 15, and a low-pressure shaft 16. The low-pressure shaft 16 couples the low-pressure compressor 14 and the low-pressure turbine 15. Moreover, the high-pressure rotary structure 12 includes a high-pressure compressor 17, a high-pressure turbine 18, and a high-pressure shaft 19. The high-pressure shaft 19 couples the high-pressure compressor 17 and the high-pressure turbine 18. The low-pressure shaft 16 penetrates an inside of the high-pressure shaft 19. The low-pressure compressor 14, the high-pressure compressor 17, the high-pressure turbine 18, and the low-pressure turbine 15 are located in this order from the upstream side toward the downstream side. Moreover, a combustor (not shown) is located between the high-pressure compressor 17 and the high-pressure turbine 18. The core casing 13 is a member that covers the low-pressure rotary structure 11 and the high-pressure rotary structure 12. The core casing 13 has a tubular shape and includes a passage of air flowing through the low-pressure rotary structure 11 and the high-pressure rotary structure 12. An outer diameter of an axially middle portion of the core casing 13 is smaller than each of an outer diameter of an axially front portion of the core casing 13 and an outer diameter of an axially rear portion of the core casing 13.

The fan 20 is located in front of the core engine 10. The fan 20 is coupled to the low-pressure rotary structure 11 of the core engine 10 and rotates together with the low-pressure rotary structure 11. Outside air having flowed through a radially inner portion of the fan 20 flows into the core engine 10, and outside air having flowed through a radially outer portion of the fan 20 bypasses the core engine 10 and flows through an annular bypass passage 21.

The inner cowl 30 has a cylindrical shape and is located so as to cover the core engine 10. The inner cowl 30 serves as an inner peripheral surface of the bypass passage 21. Moreover, an inner space 31 is between the inner cowl 30 and the core casing 13. A radial dimension of an axially middle portion of the inner space 31 is larger than each of a radial dimension of an axially front portion of the inner space 31 and a radial dimension of an axially rear portion of the inner space 31.

The outer cowl 40 has a cylindrical shape and extends rearward from the vicinity of a radially outer side of the fan 20. Moreover, the outer cowl 40 serves as an outer peripheral surface of the bypass passage 21. According to conventional gas turbine engines for use in aircrafts, an accessory gear box and an accessory are located outside the outer cowl 40, for example.

The accessory gear box 50 is a device that extracts power from the core engine 10 and supplies the extracted power to various accessories. An input shaft (not shown) of the accessory gear box 50 of the present embodiment is connected to the low-pressure rotary structure 11 or the high-pressure rotary structure 12 and extracts the power from the low-pressure rotary structure 11 or the high-pressure rotary structure 12. Moreover, the accessories that acquire the power from the accessory gear box 50 can be attached to front, side, and rear surfaces of the accessory gear box 50.

Furthermore, the accessory gear box 50 is located in the inner space 31 between the core casing 13 and the inner cowl 30. Moreover, regarding an axial position, the accessory gear box 50 is located at an axially middle portion of the inner space 31. Specifically, the accessory gear box 50 is located in the vicinity between the high-pressure compressor 17 and the high-pressure turbine 18 in the axial direction. However, the axial position of the accessory gear box 50 is not limited to this.

Moreover, as shown in FIG. 2, the accessory gear box 50 extends and curves in the circumferential direction along the core casing 13. The accessory gear box 50 of the present embodiment is located in a lower-left region of the core casing 13 (in FIG. 2, a lower-right region). However, a circumferential position of the accessory gear box 50 relative to the core casing 13 is not limited to this. Furthermore, various accessories are attached to the accessory gear box 50 so as to be lined up in the circumferential direction.

The auxiliary compressor 60 is attached to the accessory gear box 50. The auxiliary compressor 60 is attached to the accessory gear box 50 through a transmission 51 that adjusts a rotational speed of the auxiliary compressor 60. For example, the transmission 51 may be a continuously variable transmission or an electric motor. The auxiliary compressor 60 is a device that is driven by the power acquired from the accessory gear box 50 and increases the pressure of the compressed air extracted from the core engine 10. The compressed air that has been increased in pressure is supplied to the airframe 102 through the below-described compressed air pipe 70. The auxiliary compressor 60 extracts the compressed air through a bleed air pipe 61 from a portion of the core engine 10 which corresponds to the low-pressure compressor 14, the high-pressure compressor 17, or both the low-pressure compressor 14 and the high-pressure compressor 17.

As with the accessory gear box 50, the auxiliary compressor 60 of the present embodiment is located in the inner space 31 between the core casing 13 and the inner cowl 30. As above, since the accessory gear box 50 and the auxiliary compressor 60 are located in the inner space 31, the outer diameter of the entire gas turbine engine 100 can be made smaller than that when, for example, the accessory gear box 50 and the auxiliary compressor 60 are located outside the outer cowl 40.

Furthermore, the auxiliary compressor 60 of the present embodiment is located in front of the accessory gear box 50 in an axial direction of the core engine 10. Specifically, the auxiliary compressor 60 is located on the front surface of the accessory gear box 50 through the transmission 51. As described above, the auxiliary compressor 60 extracts the compressed air through the bleed air pipe 61 from the portion of the core engine 10 which corresponds to the low-pressure compressor 14, the high-pressure compressor 17, or both the low-pressure compressor 14 and the high-pressure compressor 17. Therefore, when the auxiliary compressor 60 is located in front of the accessory gear box 50, a distance between the auxiliary compressor 60 and the portion corresponding to the low-pressure compressor 14, the high-pressure compressor 17, or both the low-pressure compressor 14 and the high-pressure compressor 17 becomes short, and therefore, the bleed air pipe 61 can be made short. For the same reason, it is desirable that: the auxiliary compressor 60 be located outside the low-pressure compressor 14 or the high-pressure compressor 17 in the radial direction; and the axial position of the auxiliary compressor 60 overlap the axial position of the low-pressure compressor 14 or the axial position of the high-pressure compressor 17. In the present embodiment, the axial position of the auxiliary compressor 60 overlaps the axial position of the high-pressure compressor 17.

Moreover, as shown in FIG. 2, the auxiliary compressor 60 is attached to a portion of the accessory gear box 50 which is closer to the strut 101 than a circumferential middle portion of the accessory gear box 50. To be specific, in the present embodiment, since the strut 101 is located above the accessory gear box 50, the auxiliary compressor 60 is attached to a portion of the accessory gear box 50 which is located above the circumferential middle portion of the accessory gear box 50. The strut 101 of the present embodiment is located at a top portion of the core engine 10. However, in some cases, the strut 101 is located at a portion of the core engine 10 other than the top portion.

The compressed air pipe 70 is a pipe through which the compressed air that has been increased in pressure by the auxiliary compressor 60 is supplied to the airframe 102. The compressed air pipe 70 extends toward the strut 101 through a route that is shorter in distance to the strut 101 between a route from the auxiliary compressor 60 toward a right side in the circumferential direction along the core casing 13 and a route from the auxiliary compressor 60 toward a left side in the circumferential direction along the core casing 13. Then, the compressed air pipe 70 extends through an inside of the strut 101. In the present embodiment, the auxiliary compressor 60 is located at a left side of the core casing 13, and the strut 101 is located in the vicinity of the top portion of the core casing 13. Therefore, a distance of the route from the auxiliary compressor 60 toward the left side in the circumferential direction (counterclockwise in FIG. 2) along the core casing 13 to the strut 101 is shorter than a distance of the route from the auxiliary compressor 60 toward the right side in the circumferential direction (clockwise in FIG. 2) along the core casing 13 to the strut 101. On this account, in the present embodiment, the compressed air pipe 70 extends from the auxiliary compressor 60 toward the left side in the circumferential direction along the core casing 13 to the strut 101 and then extends through the inside of the strut 101. Moreover, as described above, the auxiliary compressor 60 is attached to the portion of the accessory gear box 50 which is closer to the strut 101 than the circumferential middle portion of the accessory gear box 50. Therefore, according to the present embodiment, the length of the compressed air pipe 70 can be suppressed.

The air starter 80 is a device that rotates the gas turbine engine 100 through the accessory gear box 50 when starting the gas turbine engine 100. The air starter 80 is driven by utilizing high-pressure air supplied from the airframe 102. The high-pressure air is supplied from the airframe 102 through the compressed air pipe 70. To be specific, the pipe of the compressed air supplied from the auxiliary compressor 60 to the airframe 102 and the pipe (compressed air pipe 70) of the compressed air supplied from the airframe 102 to the air starter 80 are the same as each other although the flow direction of the compressed air is opposite. Instead of the air starter 80, an electric starter may be used.

In the present embodiment, the auxiliary compressor 60 and the air starter 80 are attached to the accessory gear box 50 so as to be adjacent to each other in the circumferential direction. Specifically, the air starter 80 is located under the auxiliary compressor 60. As above, since the auxiliary compressor 60 and the air starter 80 are located adjacent to each other, the entire length of the shared compressed air pipe 70 can be suppressed. The positions of the auxiliary compressor 60 and the air starter 80 may be reversed.

Moreover, the auxiliary compressor 60 and the air starter 80 may be located so as to sandwich the accessory gear box 50 and face each other. To be specific, the air starter 80 may be located on the rear surface of the accessory gear box 50 such that the circumferential position of the air starter 80 is the same as or overlaps the circumferential position of the auxiliary compressor 60. Even in this case, the length of the compressed air pipe 70 can be suppressed.

Operational Advantages, etc.

As described above, the gas turbine engine for use in the aircraft according to the embodiment includes: a core engine including a low-pressure rotary structure including a low-pressure compressor and a low-pressure turbine which are coupled to each other, a high-pressure rotary structure including a high-pressure compressor and a high-pressure turbine which are coupled to each other, and a core casing that covers the low-pressure rotary structure and the high-pressure rotary structure and includes a passage of air flowing through the low-pressure rotary structure and the high-pressure rotary structure; a fan located in front of the core engine; an inner cowl that serves as an inner peripheral surface of a bypass passage that extends through the fan and bypasses the core engine; an accessory gear box that extracts power from the low-pressure rotary structure or the high-pressure rotary structure and supplies the extracted power to various accessories; an auxiliary compressor that is attached to the accessory gear box, is driven by driving power of the accessory gear box, and increases pressure of compressed air extracted from the core engine; and a compressed air pipe that extends through an inside of a strut connecting the core engine and an airframe and supplies to the airframe the compressed air that has been increased in pressure by the auxiliary compressor. The accessory gear box and the auxiliary compressor are located in an inner space between the core casing and the inner cowl.

According to this configuration, since the accessory gear box and the auxiliary compressor are located inside the inner cowl, the outer diameter of the entire gas turbine engine can be made smaller than that when the accessory gear box and the auxiliary compressor are located outside the fan case.

Moreover, in the gas turbine engine according to the present embodiment, the auxiliary compressor is located in front of the accessory gear box.

According to this configuration, the bleed air pipe connecting the core engine and the auxiliary compressor can be made short.

Moreover, in the gas turbine engine according to the present embodiment, the auxiliary compressor is located outside the low-pressure compressor or the high-pressure compressor in a radial direction, and an axial position of the auxiliary compressor overlaps an axial position of the low-pressure compressor or an axial position of the high-pressure compressor.

According to this configuration, the bleed air pipe connecting the core engine and the auxiliary compressor can be made further short.

Moreover, in the gas turbine engine according to the present embodiment, the compressed air pipe extends toward the strut through a route that is shorter in distance to the strut between a route from the auxiliary compressor toward a right side in a circumferential direction along the core casing and a route from the auxiliary compressor toward a left side in the circumferential direction along the core casing. The compressed air pipe then extends through the inside of the strut.

According to this configuration, the length of the compressed air pipe can be suppressed.

Moreover, in the gas turbine engine according to the present embodiment, the accessory gear box extends and curves in the circumferential direction along the core casing. The accessories are attached to the accessory gear box so as to be lined up in the circumferential direction. The auxiliary compressor is attached to a portion of the accessory gear box which is located closer to the strut than a circumferential middle portion of the accessory gear box.

According to this configuration, the length of the compressed air pipe can be suppressed.

Moreover, the gas turbine engine according to the present embodiment includes an air starter that, when starting the gas turbine engine, is supplied with high-pressure air from the airframe through the compressed air pipe and rotates the gas turbine engine through the accessory gear box by using the supplied high-pressure air as a driving source. The auxiliary compressor and the air starter are attached to the accessory gear box so as to be adjacent to each other in the circumferential direction or so as to sandwich the accessory gear box and face each other.

According to this configuration, when the compressed air is supplied from the airframe to the air starter through the compressed air pipe, the entire length of the compressed air pipe can be suppressed.

Moreover, the gas turbine engine according to the present embodiment further includes a transmission that is attached to the accessory gear box, changes a speed of driving power output from the accessory gear box, and rotates the auxiliary compressor.

According to this configuration, the rotational speed of the auxiliary compressor can be arbitrarily adjusted.

The invention claimed is:

1. A gas turbine engine for use in an aircraft, the gas turbine engine comprising:
   a core engine including
      a low-pressure rotary structure including a low-pressure compressor and a low-pressure turbine which are coupled to each other,
      a high-pressure rotary structure including a high-pressure compressor and a high-pressure turbine which are coupled to each other, and
      a core casing that covers the low-pressure rotary structure and the high-pressure rotary structure and includes a passage of air flowing through the low-pressure rotary structure and the high-pressure rotary structure;
   a fan located in front of the core engine;
   an inner cowl that serves as an inner peripheral surface of a bypass passage that extends through the fan and bypasses the core engine;
   an accessory gear box that extracts power from the low-pressure rotary structure or the high-pressure rotary structure and supplies the power to various accessories;
   an auxiliary compressor that is attached to the accessory gear box through a continuously variable transmission, is driven by driving power of the accessory gear box, and increases pressure of compressed air extracted from the core engine; and
   a compressed air pipe that extends through an inside of a strut connecting the core engine and an airframe and supplies to the airframe the compressed air that has been increased in pressure by the auxiliary compressor, wherein
   the continuously variable transmission changes a rotational speed of the accessory gear box,
   the accessory gear box and the auxiliary compressor are located in an inner space between the core casing and the inner cowl,
   the compressed air pipe extends toward the strut through a route that is shorter in distance to the strut between a route from the auxiliary compressor toward a right side in a circumferential direction along the core casing and a route from the auxiliary compressor toward a left side in the circumferential direction along the core casing; and
   the compressed air pipe then extends through the inside of the strut.

2. The gas turbine engine according to claim 1, wherein the auxiliary compressor is located in front of the accessory gear box in an axial direction of the core engine.

3. The gas turbine engine according to claim 2, wherein:
   the auxiliary compressor is located outside the low-pressure compressor or the high-pressure compressor in a radial direction; and
   an axial position of the auxiliary compressor overlaps an axial position of the low-pressure compressor or an axial position of the high-pressure compressor.

4. The gas turbine engine according to claim 1, wherein:
   the accessory gear box extends and curves in the circumferential direction along the core casing;
   the various accessories are attached to the accessory gear box so as to be lined up in the circumferential direction; and
   the auxiliary compressor is attached to a portion of the accessory gear box which is located closer to the strut than a circumferential middle portion of the accessory gear box.

5. The gas turbine engine according to claim 4, comprising an air starter that, when starting the gas turbine engine, is supplied with high-pressure air from the airframe through the compressed air pipe and rotates the gas turbine engine through the accessory gear box by using the supplied high-pressure air as a driving source, wherein
   the auxiliary compressor and the air starter are attached to the accessory gear box so as to be adjacent to each other in the circumferential direction or so as to sandwich the accessory gear box and face each other.

* * * * *